March 1, 1960     W. KNAŪF     2,926,580

FOLDING FOCUSING HOOD FOR REFLEX CAMERAS

Filed March 10, 1958     2 Sheets-Sheet 1

March 1, 1960 W. KNAUF 2,926,580
FOLDING FOCUSING HOOD FOR REFLEX CAMERAS
Filed March 10, 1958 2 Sheets-Sheet 2

United States Patent Office 2,926,580
Patented Mar. 1, 1960

2,926,580

FOLDING FOCUSING HOOD FOR REFLEX CAMERAS

Wilhelm Knauf, Braunschweig, Germany, assignor to Franke & Heidecke, Fabrik Photographischer Präzisions-Apparate, Braunschweig, Germany, a firm of Germany Application March 10, 1958, Serial No. 720,205

Claims priority, application Germany March 13, 1957

7 Claims. (Cl. 95—47)

This invention relates to a focusing hood for reflex cameras, and particularly to such a hood which can be detached from the camera, which can be folded into a compact condition when detached, and which is provided with binocular magnifying means so arranged that the magnifying means does not prevent the folding or collapsing of the hood.

An object of the invention is the provision of a generally improved and more satisfactory hood structure of this kind.

Another object is the provision of a hood structure so designed as to have a minimum of parts, and to be sturdy and reliable in operation.

A further object is the provision of a folding hood structure in which, without undue complexity of the parts, the binocular magnifying means may be easily removed for cleaning, and also may be adjusted for differences of interpupilary distance of the eyes of the user.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
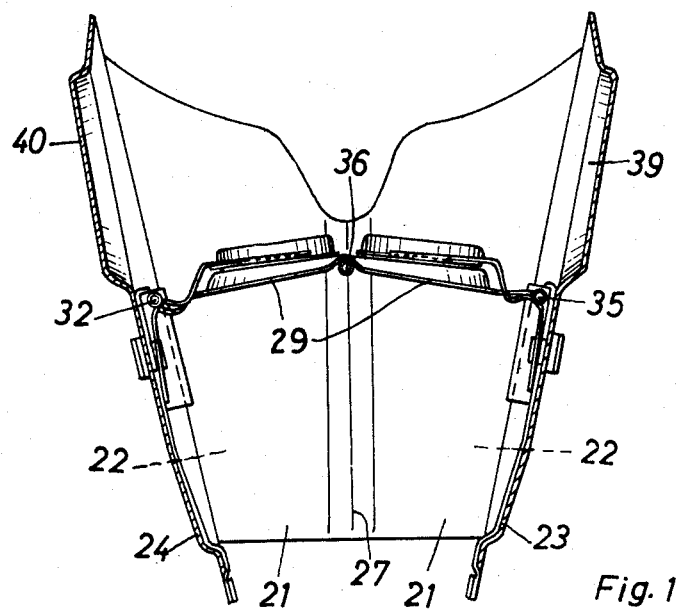
Fig. 1 is a somewhat diagrammatic or schematic vertical section taken centrally through a hood in accordance with a preferred embodiment of the present invention.

The focusing hood of the present invention is particularly but not exclusively for use on cameras of the kind known as twin lens reflex cameras. As well understood in the art, twin lens reflex cameras are provided with a folding hood which is usually permanently mounted on the top of the camera, examples thereof being seen in Bretthauer Patent 2,641,955 and Scholkemeier Patent 2,642,790. But for special purposes it is sometimes desired to use special hoods, either as an attachment for the regular folding hood normally supplied on the camera or as a substitute for such regular hood, removing the latter from the camera. The focusing hood of the present invention is useful in either of these ways, it being immaterial for present purposes whether the regular hood is removed and replaced by the present hood, or whether the present hood is used in conjunction with the regular hood, extending upwardly therefrom as a prolongation thereof.

The hood may comprise front and rear walls 21 and 22, and lateral or side walls 23 and 24, connected to each other by hinge joints at the corners. If the walls are made of semi-stiff material such as leather, the hinge joints may be simply creases formed in the material of the walls. In addition to the hinge joints at the corners, the front and rear walls 21 and 22 are provided with vertically extending central creases 27, whereby the front and rear walls may be folded inwardly toward each other, in known manner.

Mounted within the hood there is binocular magnifying means in the form of two magnifying lenses, one for each eye of the observer. These lenses are carried by a lens support 29 comprising two sections extending inwardly from the opposite side walls 23 and 24 of the hood, and meeting at the center where they are pivotally articulated to each other by means of a central hinge 36. The outer or lateral ends of the support 29 are hinged to their respective side walls of the hood structure by hinges 32 and 35. When the hood is collapsed, the central hinge 36 moves vertically upwardly, and the two portions 29 of the support swing laterally against the side walls 23 and 24 of the hood, the support and the lenses carried thereby being received within pockets formed by outwardly bulged portions 39 and 40 of the side walls.

Figure 3:
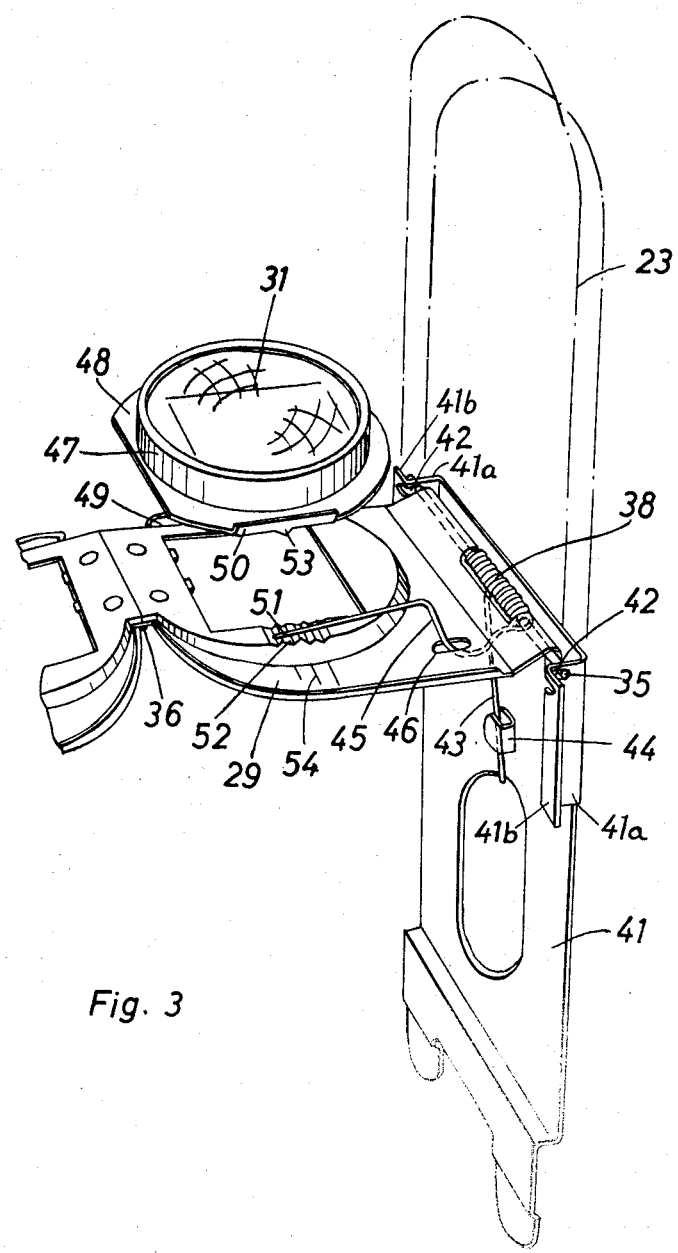
Fig. 3 is a fragmentary perspective view of certain parts of the hood, illustrating details of the invention.

The hinges 32 and 35 at the opposite ends of the lens support 29 are identical with each other, and a description of one will suffice for both. Secured to the inner face of the side wall at one side (e.g., the side wall 23) is a metal plate 41 having near its upper end two flanges 41a which are bent inwardly and spaced substantially from each other in a direction from front to back of the hood. At the inner ends of these flanges, the metal is bent again to form flanges 41b which extend away from each other, forwardly and rearwardly, all as seen clearly in Fig. 3.

Figure 2:
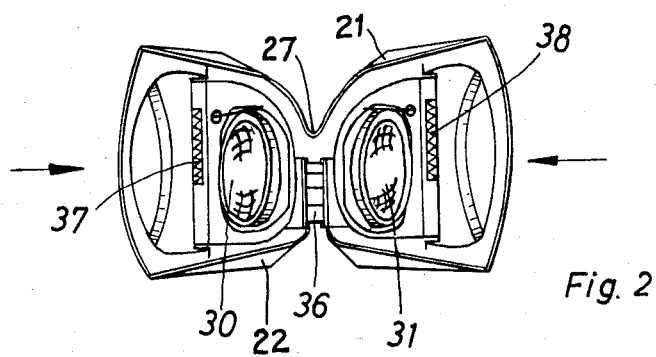
Fig. 2 is a plan of the hood in partially collapsed condition, looking downwardly at the upper end thereof.

The hinge pin 35 is received at its ends loosely in the notches 42 of the flanges 41a and 41b. (The other hinge pin 32 on the other side of the hood is similarly received in similar notches at its side of the hood structure, of course.) The coiled spring 38 surrounds a part of the hinge pin 35 near the center thereof, and one end of this spring projects downwardly as seen at 43 and is caught behind a hook-like projection 44 stamped out of the metal of the plate 41. (The similar spring on the other hinge pin 32 is indicated in Fig. 2 by the numeral 37, but is otherwise like the spring 38 above described.) The other arm 45 of the spring extends below the magnifier support 29 for a distance, as shown, then extends upwardly through a slot 46 in the support 29, and continues toward the center (i.e., toward the central hinge 36) far enough to overlie and bear downwardly on a flange 48 on the lens support or mount 47 which holds one of the binocular magnifiers 31. (The other magnifier 30 is similarly held.)

The spring portion 45 lies near one edge of the support 29 (the near edge, when viewed as in Fig. 3) while at the other (or far) edge thereof there is a stirrup-like or U-shaped member 49 formed on the support 29, under which member 49 one edge of the flange 48 may be thrust. Then the end 51 of the spring portion 45 overlies the flange 48 on the other side of the lens 31, thus holding the near side of the flange 48 down firmly on the support 29, while the far side of the flange is held by the U-shaped or stirrup member 49. An upturned flange 50 on the flange 48 prevents the portion 51 of the spring from being accidentally displaced off of the flange 48.

Preferably the top surface of the support 29 is formed with a series of parallel notches or grooves 52, and the bottom surface of the flange 48 of the lens mount is formed with a nose or ridge 53 which may be placed in any desired one of the grooves 52, being held therein by the pressure of the spring 45, 51. Thus the two magnifying lenses 30 and 31 may be placed closer or farther away from each other, in accordance with the interpupilary distance of the observer's eyes, by placing the noses 53 of the respective lenses in any desired ones of the grooves 52.

Thus it is seen that each lens mount may be individually taken out of the hood structure in a very simple manner, simply by flexing the spring portion 45, 51 to raise it above the upturned flange 50 and then swing it laterally so that the lens mount may be lifted up a little and then pulled laterally out from under the stirrup 49. The lenses may thus be removed easily for cleaning. Also, the entire lens support may be very easily removed from the hood, by flexing the lower end 43 of each spring 37 and 38, to displace it from the hook portion 44. When the spring has been removed from the hook portion, the pins 32 and 35 may easily be moved toward the center of the hood, sliding them out of the open ends of the notches 42.

When the lens support is in proper position within the hood, and the two lenses are mounted on the support, the springs tend to open the support to the erected position shown in Fig. 1, and also serve to hold the individual lens mounts 47 in proper position on the support. To collapse the hood (without taking the lenses or the support out of the hood) a finger is placed under the central part of the support (near the hinge 36) and this central part is lifted upwardly, thus folding the two halves of the support 29 against the force of their respective springs 37 and 38. The front and side walls of the hood fold and collapse, of course, simultaneously with the collapsing movement of the support 29. When the hood is again opened up to its erected position, the springs 37 and 38 automatically move the lens support 29 to its erected or unfolded position. Adjustment of the interpupilary distance of the lenses is accomplished very simply and quickly when the parts are in the extended or "ready" position.

The binocular magnifying lenses enable the operator to see very fine detail on the ground glass focusing screen at the top of the camera. The upper edges of the walls of the hood are shaped to fit tightly against the head of the user, who places his head over the hood and looks downwardly into the top of the hood, of course, in the manner well understood in the photographic field.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A collapsible focusing hood for cameras, comprising a hollow erectable and collapsible body including opposite side walls, a magnifying lens supporting structure extending crosswise of said body between said opposite side walls and hingedly connected respectively at opposite ends to both of said side walls, means forming a pair of spaced slots adjacent each one of said side walls, a hinge pin connected to said supporting structure at each end thereof and removably received in and removable from one pair of said slots by movement in a direction perpendicular to the length of the pin, and springs tending to hold said pins in their respective slots.

2. A collapsible focusing hood for cameras, comprising a hollow erectable and collapsible body including opposite side walls, a binocular magnifying lens supporting structure extending crosswise of said body between said opposite side walls and having a central hinge so that two portions of said supporting structure may fold upon themselves, opposite ends of said supporting structure being hingedly connected respectively to both of said side walls, means forming a pair of spaced slots adjacent each one of said side walls, a hinge pin connected to said supporting structure at each end thereof and removably received in and removable from one pair of said slots by movement in a direction perpendicular to the length of the pin, and springs simultaneously tending to hold said hinge pins seated in their respective slots and to swing said supporting structure relative to the axis of said hinge pin.

3. A construction as defined in claim 2, further including a pair of binocular lenses mounted on said lens supporting structure for use in magnified binocular viewing of a focusing screen with which said focusing hood is used, and means adjustably mounting at least one of said lenses for lateral movement toward and away from the other of said lenses to vary the interpupilary distance of said lenses.

4. A construction as defined in claim 3, in which said means for adjustably mounting one of said lenses includes a lens mount member, a stirrup member on said supporting structure at one side of said lens mount member, means forming a plurality of spaced depressions on said supporting structure at the other side of said lens mount member, a projecting portion on one side of said lens mount member for engaging said stirrup member to be retained thereby, and a projecting portion on the opposite side of said lens mount member for engaging in a selected one of said spaced depressions.

5. A collapsible focusing hood for cameras, comprising a hollow erectable and collapsible body including opposite side walls movable toward and away from each other upon collapsing and erecting said body, a magnifying lens supporting structure extending crosswise of said body between said opposite side walls and divided into two parts by a central hinge and hingedly connected to both of said side walls, a pair of binocular lens mounts removably supported on said supporting structure for binocular viewing of a focusing screen with which said focusing hood is used, and spring means holding said lens mounts in any of a plurality of positions on said supporting structure at different distances from each other to vary the interpupillary spacing of the two lens mounts.

6. A construction as defined in claim 5, in which said supporting structure is provided with a plurality of recesses adjacent each of said lens mounts, and in which each lens mount has a projection adapted to be seated in a selected one of said recesses.

7. A detachable and collapsible light hood for the focusing screen of a camera, said hood comprising two opposite side walls collapsible by movement toward each other and erectable by movement away from each other, a binocular magnifier lens support having a central hinge and also having two other hinges substantially parallel to said central hinge for fastening opposite ends of said lens support respectively to said opposite side walls, each of said side walls having pin-receiving slots, each of said two other hinges having a pin removably received in said pin-receiving slots of its respective side wall, a pair of lens mounts removably mounted on said lens support on opposite sides of said central hinge, and a coil spring coiled around each hinge pin of said two other hinges, each of said springs having one end releasably engaging one of said lens mounts to tend to hold such mount in place on said support and having another end releasably secured to one of said side walls of said hood to tend to hold the hinge pin encircled by said spring in operative position in its respective pin-receiving slots.

References Cited in the file of this patent

UNITED STATES PATENTS

| 741,102 | Borsum | Oct. 13, 1903 |
| 2,500,058 | Brundage | Mar. 7, 1950 |

FOREIGN PATENTS

| 183,626 | Great Britain | Aug. 3, 1922 |